United States Patent
Tian

(10) Patent No.: US 12,219,185 B2
(45) Date of Patent: Feb. 4, 2025

(54) INTERFACE LOADING METHOD, TERMINAL DEVICE, SERVER AND STORAGE MEDIUM

(71) Applicant: Beijing Bytedance Network Technology Co., Ltd., Beijing (CN)

(72) Inventor: Ye Tian, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/438,055

(22) Filed: Feb. 9, 2024

(65) Prior Publication Data

US 2024/0187656 A1    Jun. 6, 2024

Related U.S. Application Data

(63) Continuation of application No. 17/812,964, filed on Jul. 15, 2022, now Pat. No. 11,936,922, which is a continuation of application No. PCT/CN2020/129302, filed on Nov. 17, 2020.

(30) Foreign Application Priority Data

Jan. 17, 2020 (CN) .......... 202010055673.2

(51) Int. Cl.
H04N 21/2187 (2011.01)
H04N 21/431 (2011.01)

(52) U.S. Cl.
CPC ....... *H04N 21/2187* (2013.01); *H04N 21/431* (2013.01)

(58) Field of Classification Search
None
See application file for complete search history.

(56) References Cited

U.S. PATENT DOCUMENTS

2014/0115111 A1* 4/2014 Duskin ............. G06Q 30/0255 709/219
2017/0249707 A1* 8/2017 Koch ................ G06Q 30/0241

* cited by examiner

*Primary Examiner* — Toan H Vu
(74) *Attorney, Agent, or Firm* — Astute IP Law Group

(57) ABSTRACT

Provided are a live stream interface loading method and apparatus, a terminal, a server and a storage medium. The live stream interface loading method includes: acquiring live stream interaction area loading sequence information; detecting a trigger instruction, wherein the trigger instruction is used for indicating display of a live stream interface; and loading and displaying a plurality of interaction areas in the live stream interface according to the live stream interaction area loading sequence information.

17 Claims, 9 Drawing Sheets

INTERFACE LOADING METHOD, TERMINAL DEVICE, SERVER AND STORAGE MEDIUM

CROSS-REFERENCES TO RELATED APPLICATIONS

This application is a continuation of U.S. patent applicant Ser. No. 17/812,964, filed on Jul. 15, 2022, which is a Continuation application of International Patent Application No. PCT/CN2020/129302, filed on Nov. 17, 2020, which claims priority to Chinese Patent Application No. 202010055673.2 filed with the China National Intellectual Property Administration (CNIPA) on Jan. 17, 2020, disclosures of which are incorporated herein by reference in their entireties.

TECHNICAL FIELD

The present disclosure relates to the field of computer technology, for example, a live stream interface loading method and apparatus, a terminal, a server and a storage medium.

BACKGROUND

The live stream refers to the live stream program played by the network anchor on the live stream platform website. The audience can find the live stream of the anchor by entering the anchor name, channel number or room number on the live stream platform website where the anchor performs live streaming.

According to the functions, the live stream interface is split into different interaction areas, and the controls in the interaction areas are called interaction controls, such as follow controls, leaderboard controls, gift controls and comment controls. After the audience enters a live stream, the live stream interface is displayed in the following mode: the anchor screen is displayed first, then the interaction controls are loaded from left to right and from top to bottom, and the interaction areas are displayed after the interaction controls of all interaction areas are loaded. As can be seen from the above, in the related solutions, only after all interaction controls are loaded can the interaction areas in the live stream interface be displayed, which prolongs the loading waiting time and affects the interaction efficiency.

SUMMARY

The present disclosure provides a live stream interface loading method and apparatus, a terminal, a server and a storage medium, which can solve the problem of long waiting time for loading interaction areas in the live stream interface.

A live stream interface loading method is provided and includes the steps described below.

Live stream interaction area loading sequence information is acquired.

A trigger instruction is detected, where the trigger instruction is used for indicating display of a live stream interface.

A plurality of interaction areas in the live stream interface are loaded and displayed according to the live stream interaction area loading sequence information.

A live stream interface loading method is further provided and includes the steps described below.

An object identity and usage frequency information of a plurality of interaction areas in a live stream interface are acquired from a client.

Live stream interaction area loading sequence information corresponding to the object identity is determined according to the usage frequency information.

The live stream interaction area loading sequence information is sent to the client.

A live stream interface loading apparatus is further provided and includes a sequence acquisition module, an instruction detection module, and an interaction area loading module.

The sequence acquisition module is configured to acquire live stream interaction area loading sequence information.

The instruction detection module is configured to detect a trigger instruction, where the trigger instruction is used for indicating the display of a live stream interface.

The interaction area loading module is configured to load and display a plurality of interaction areas in the live stream interface according to the live stream interaction area loading sequence information.

A live stream interface loading apparatus is further provided and includes a frequency acquisition module, a sequence determination module, and a sequence sending module.

The frequency acquisition module is configured to acquire an object identity and usage frequency information of a plurality of interaction areas in a live stream interface from a client.

The sequence determination module is configured to determine live stream interaction area loading sequence information corresponding to the object identity according to the usage frequency information.

The sequence sending module is configured to send the live stream interaction area loading sequence information to the client.

A terminal device is further provided and includes one or more processors and a memory, which is configured to store one or more programs.

The one or more programs, when executed by the one or more processors, cause the one or more processors to perform the live stream interface loading method described above.

A server is further provided and includes one or more processors and a memory, which is configured to store one or more programs.

The one or more programs, when executed by the one or more processors, cause the one or more processors to perform the live stream interface loading method described above.

A computer-readable storage medium is further configured. The computer-readable storage medium stores a computer program which, when executed by a processor, performs the live stream interface loading method provided in the embodiments in the present disclosure.

DETAILED DESCRIPTION

Embodiments of the present disclosure will be described with reference to the drawings. The drawings illustrate some embodiments of the present disclosure, but the present disclosure may be implemented in various ways and should not be construed as limited to the embodiments set forth herein. The drawings and embodiments of the present disclosure are not intended to limit the scope of the present disclosure.

Steps recorded in the method embodiments may be executed in different sequences and/or concurrently. In addition, the method embodiments may include additional steps and/or steps whose execution is omitted. The scope of the present disclosure is not limited thereto.

As used herein, the term "including" and its variants are open-ended terms, that is, "including but not limited to". The term "based on" refers to "based at least in part on". The term "one embodiment" refers to "at least one embodiment"; the term "another embodiment" refers to "at least one additional embodiment"; the term "some embodiments" refers to "at least some embodiments". Relevant definitions of other terms will be given in the following description.

The concepts of "first", "second" and the like involved in the present disclosure are used for distinguishing different apparatuses, modules or units and are not used for limiting the sequence or interdependence of functions performed by these apparatuses, modules or units.

The terms "one" and "multiple" in the present disclosure are illustrative and non-limiting and should be understood as "one or more" unless the context clearly dictates otherwise.

The names of messages or information that are interacted between multiple apparatuses in the embodiments of the present disclosure are for illustrative purposes only and are not intended to limit the scope of such messages or information.

Figure 1:
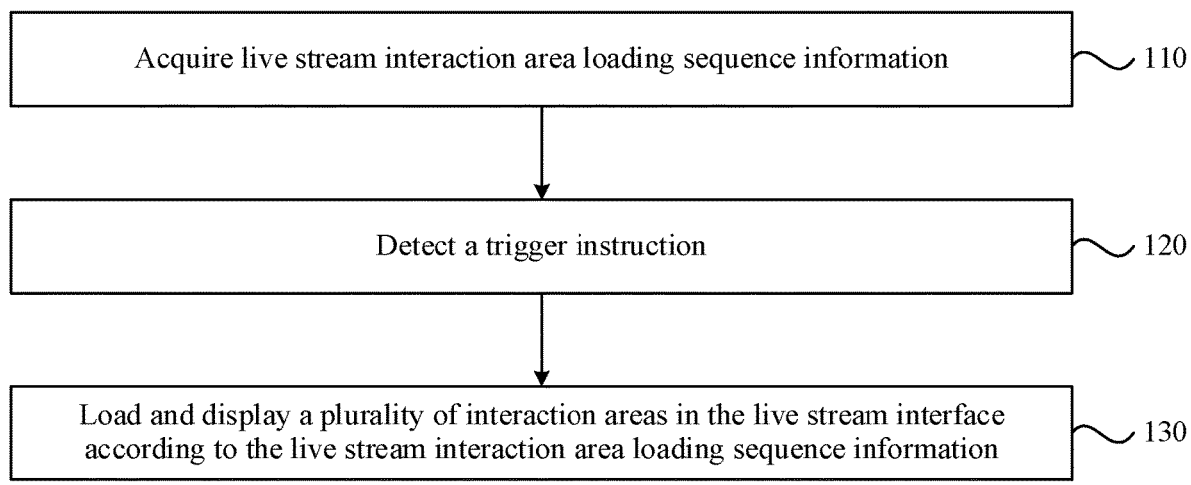
FIG. 1 is a flowchart of a live stream interface loading method provided by an embodiment of the present disclosure.

FIG. 1 is a flowchart of a live stream interface loading method provided by an embodiment of the present disclosure. This embodiment can be applied to the case of optimizing the loading strategy of a live stream interface. The method can be executed by a live stream interface loading apparatus, and the apparatus can be composed of hardware and/or software and can be integrated into a computer terminal such as a smartphone, a tablet computer, a personal computer, a notebook computer, a palmtop computer and a smart appliance. As shown in FIG. 1, the method includes steps 110, 120 and 130.

In step 110, live stream interaction area loading sequence information is acquired.

In this embodiment of the present disclosure, the live stream interaction area loading sequence information is cached in a preset storage location of a terminal device, or the live stream interaction area loading sequence information is stored in a server. For example, when a set condition is satisfied, the live stream interaction area loading sequence information is acquired from the preset storage location of the terminal device, or the live stream interaction area loading sequence information is obtained from the server or the live stream interaction area loading sequence information pushed by the server is received. For example, an interface may be a channel interface, such as a live stream channel interface, or a followed channel interface.

For example, the live stream interaction area loading sequence information may be acquired in one of the following manners. An object identity is acquired, and the live stream interaction area loading sequence information is acquired from a preset storage location according to the object identity. An object identity is acquired, and the live stream interaction area loading sequence information is acquired from a server according to the object identity. The object may refer to a viewer.

In an embodiment, the client may be understood as an application that provides live stream service for objects. The interaction area loading sequence is a loading sequence of interaction areas in a live stream interface, and each interaction area contains one or more interaction controls. In an embodiment, the interaction areas may include interaction elements for achieving an interaction function and also be called as functional areas.

For example, an object identity is acquired, an interaction area loading sequence pushed by the server is queried according to the object identity, and a target loading sequence corresponding to the object is acquired. The object identity may be an object name or a login name. If one client is used by multiple objects, multiple interaction area loading sequences pushed by the server may be received, and the interaction area loading sequence is associated with the object identity. The interaction area loading sequences pushed by the server are queried according to the object identity, and a target loading sequence corresponding to a current object is acquired.

In step 120, a trigger instruction is detected.

In an embodiment, the trigger instruction, for example a click operation, is used for indicating the display of a live stream interface.

In an embodiment, the embodiments of the present disclosure do not limit the sequence of the step of acquiring the live stream interaction area loading sequence information and the step of detecting the trigger instruction. The step of acquiring the live stream interaction area loading sequence information may be performed before the step of detecting the trigger instruction, or the step of acquiring the live stream interaction area loading sequence information may be performed after the step of detecting the trigger instruction. For example, the corresponding live stream interaction area loading sequence information may be acquired in advance so that after a trigger instruction is detected, the interaction areas in the live stream interface are loaded according to the live stream interaction area loading sequence information. In another example, the live stream interaction area loading sequence information is acquired after the trigger instruction is detected, and then the interaction areas in the live stream interface are loaded according to the live stream interaction area loading sequence information.

In step 130, a plurality of interaction areas in the live stream interface are loaded and displayed according to the live stream interaction area loading sequence information.

For example, the interaction areas in the live stream interface are sequentially loaded according to the live stream interaction area loading sequence information, and every time an interaction control in one interaction area is loaded, the interaction control is displayed. The target loading sequence indicates the sequence of loading interaction areas corresponding to the current object, and the interaction areas in the live stream interface are loaded and displayed sequentially based on the target loading sequence.

Figure 2A:
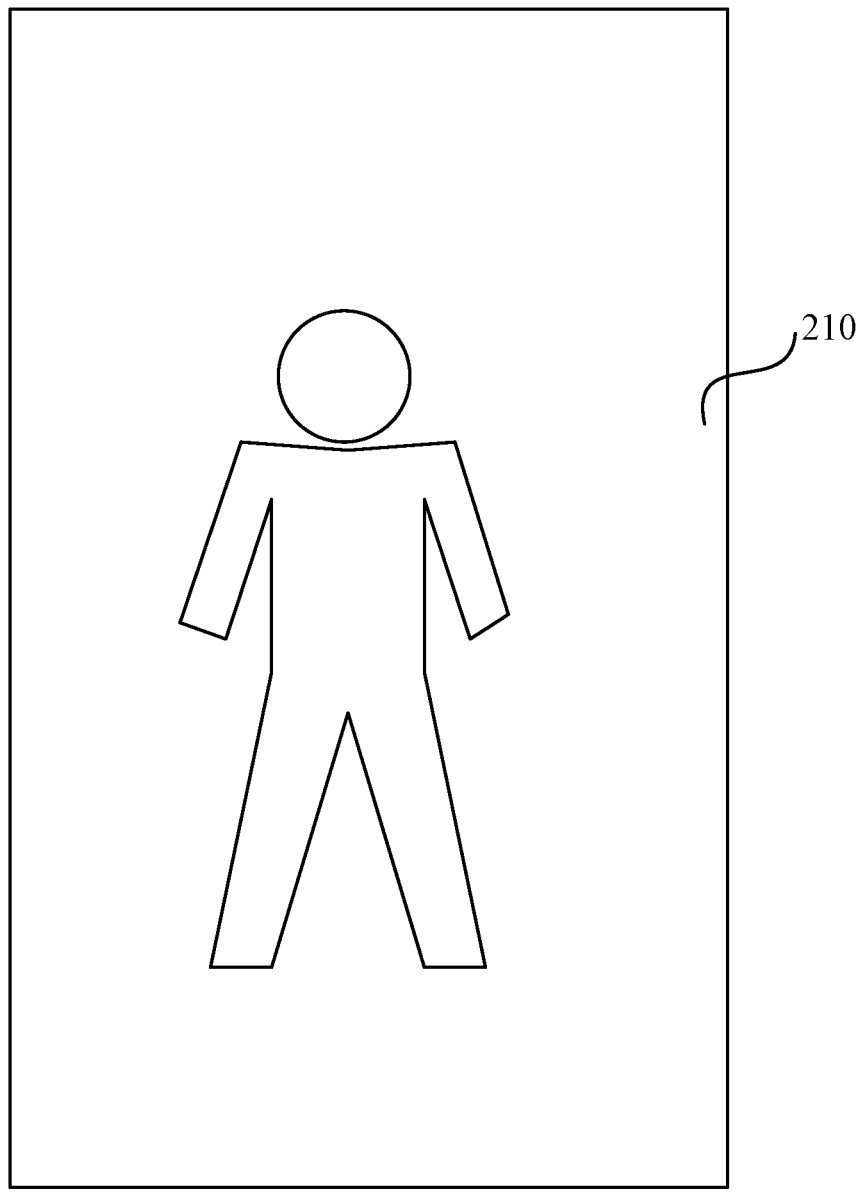
FIG. 2A is a schematic diagram of a live stream interface provided by an embodiment of the present disclosure.
Figure 2B:
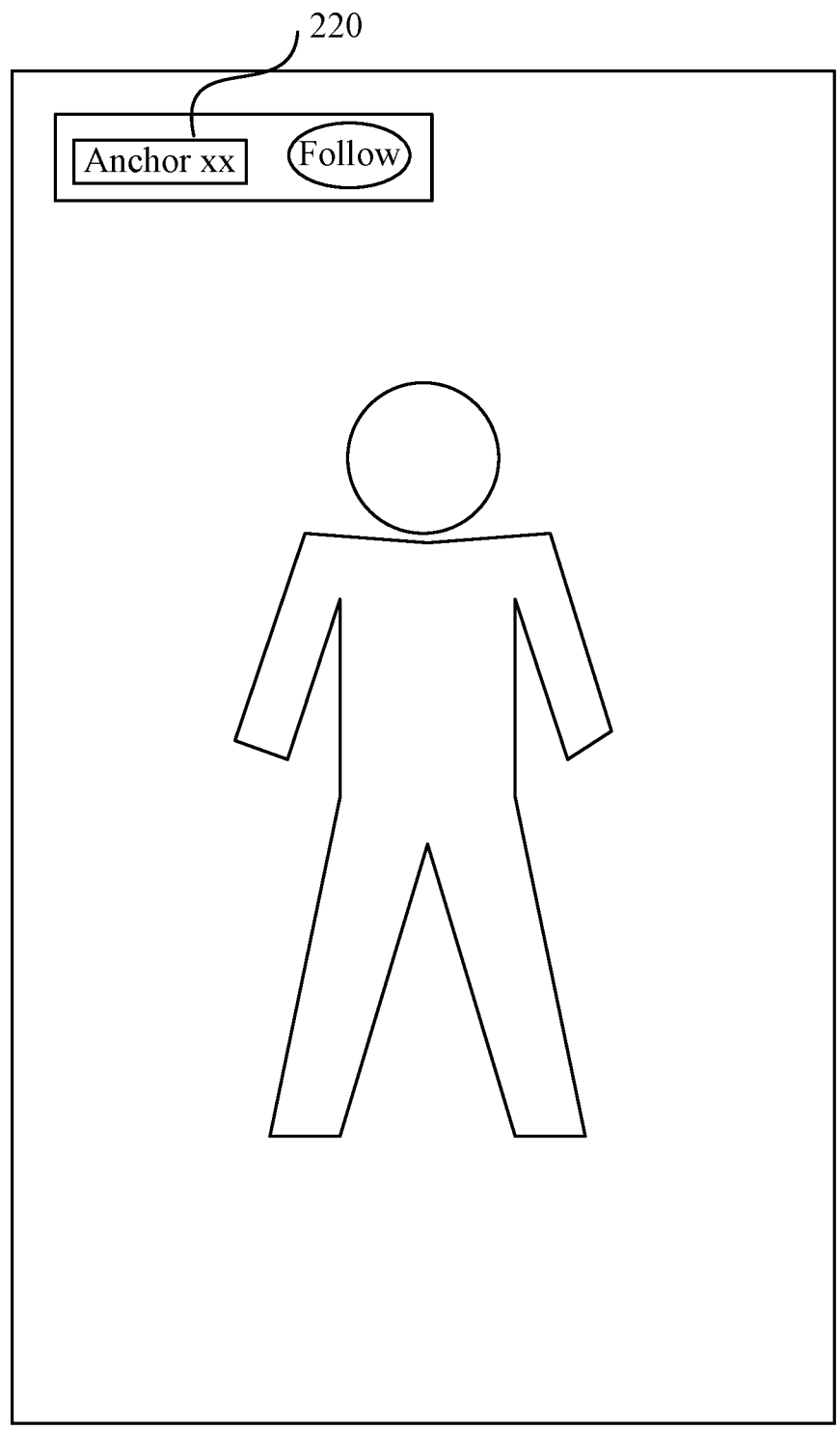
FIG. 2B is a schematic diagram of another live stream interface provided by an embodiment of the present disclosure.
Figure 2C:
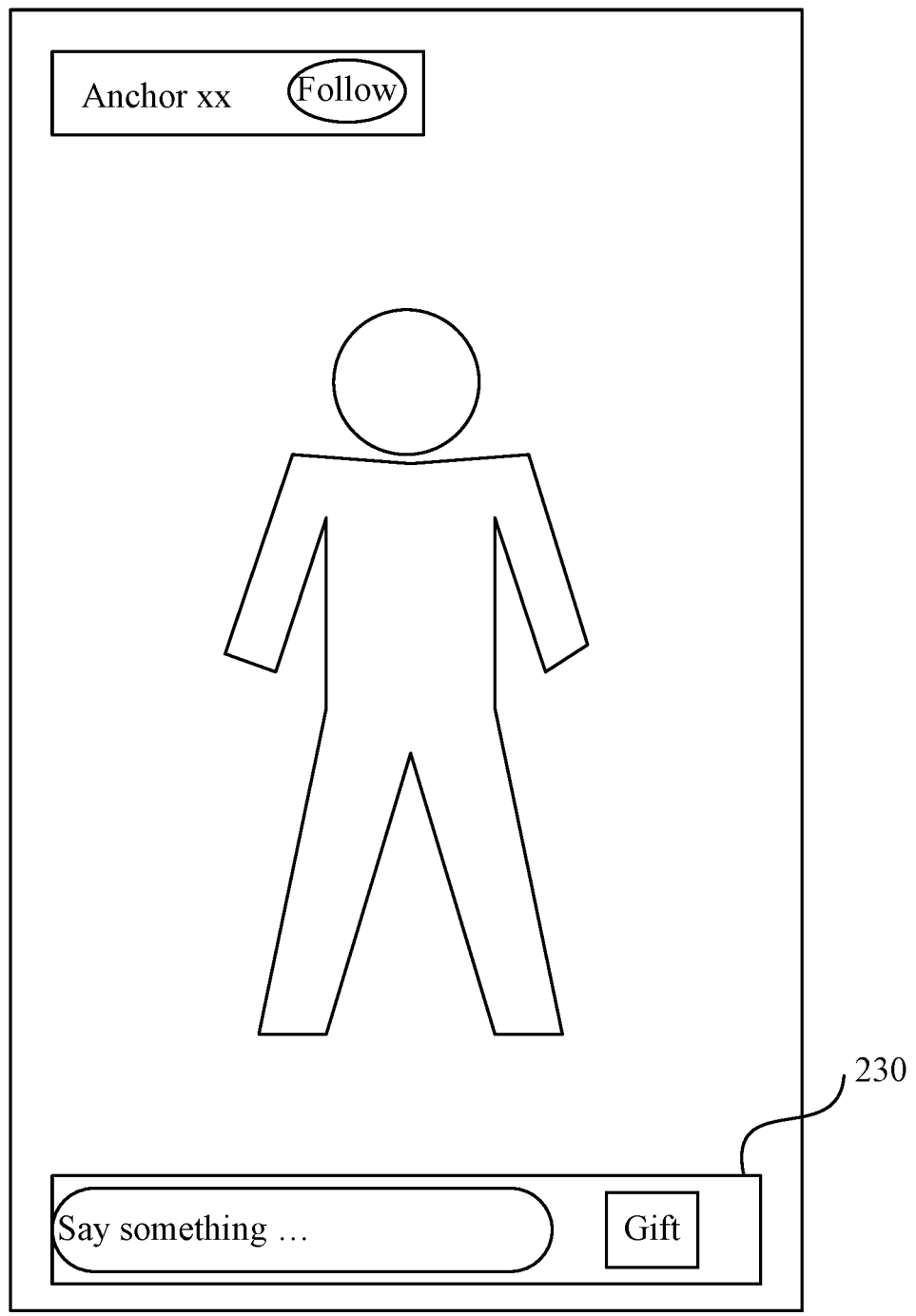
FIG. 2C is a schematic diagram of yet another live stream interface provided by an embodiment of the present disclosure.
Figure 2D:
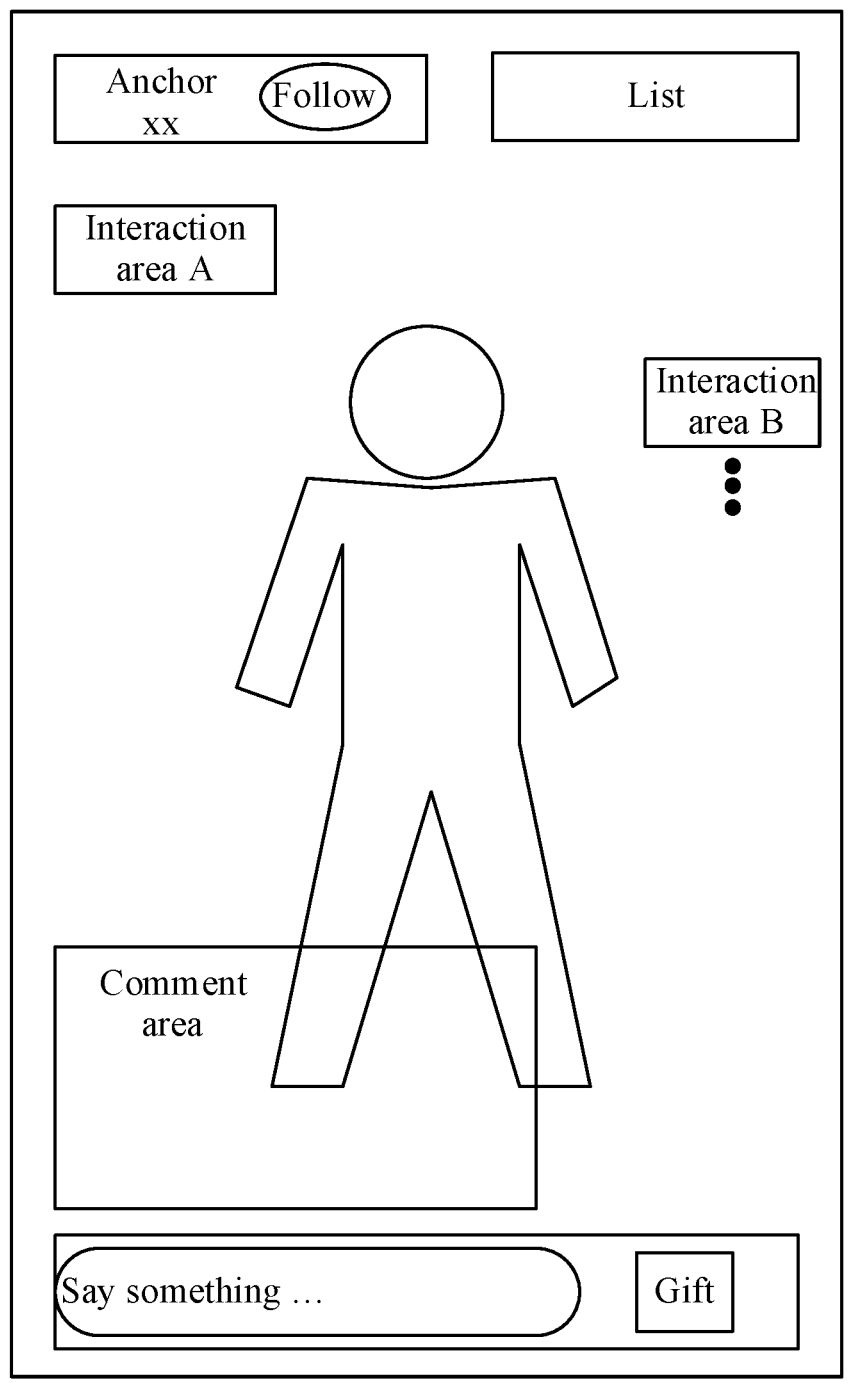
FIG. 2D is a schematic diagram of yet another live stream interface provided by an embodiment of the present disclosure.

FIG. 2A is a schematic diagram of a live stream interface provided by an embodiment of the present disclosure. As shown in FIG. 2A, when it is detected that a target object enters a live stream, the client displays an anchor screen 210 in the live stream, a target loading sequence corresponding to the target object is acquired, and interaction areas in the live stream interface are sequentially loaded according to the target loading sequence. The step of loading the interaction areas includes: acquiring relevant information of an interaction control contained in the interaction area, and rendering the interaction control according to the relevant information of the interaction control. The interaction control is displayed after the interaction control is rendered. Then, the next interaction area is loaded and displayed until all interaction areas of the live stream interface are loaded. For example, when the target loading sequence is follow interaction area, gift interaction area, leaderboard interaction area, comment interaction area, interaction area A, interaction area B, etc., FIG. 2B is a schematic diagram of another live stream interface provided by an embodiment of the present disclosure. As shown in FIG. 2B, after a follow control contained in the follow interaction area is loaded, the follow control in the follow interaction area 220 is displayed. FIG. 2C is a schematic diagram of yet another live stream interface provided by an embodiment of the present disclosure. As shown in FIG. 2C, after a gift control contained in the gift interaction area is loaded, the gift control in the gift interaction area 230 is displayed. In the same manner, the interaction areas in the live stream interface are loaded sequentially according to the target loading sequence, and finally, the live stream interface as shown in the schematic diagram of the live stream interface in FIG. 2D is presented.

In the live stream interface loading scheme provided by this embodiment of the present disclosure, live stream interaction area loading sequence information is acquired, a trigger command is detected, and the interaction areas in the live stream interface are loaded and displayed according to the live stream interaction area loading sequence information, thereby shortening the waiting time for objects to operate interaction areas, and avoiding the problem that the interaction efficiency is affected due to the long waiting time for loading interaction areas.

By the technical solution provided by this embodiment of the present disclosure, the live stream interaction area loading sequence can better meet the requirement of users, shortening the waiting time for users to operate interaction areas, avoiding the problem that the interaction efficiency is affected due to the long waiting time for loading interaction areas, and improving the experience of users.

In an exemplary embodiment, after the interaction areas in the live stream interface are loaded and displayed according to the live stream interaction area loading sequence information, the method further includes the following: usage frequency information of the interaction areas in the live stream interface is determined. After the client determines the usage frequency information of the interaction areas, the client sends the usage frequency information to the server. The usage frequency information is used for determining the live stream interaction area loading sequence information, for example, the usage frequency information is used for updating the live stream interaction area loading sequence information.

Optionally, the client counts the usage frequencies of multiple object interaction areas and updates the live stream interaction area loading sequence information according to the usage frequency information. For example, a click hot zone map is drawn according to the usage frequency information and the object identity; an interaction area priority associated with a product promotion strategy is acquired; the live stream interaction area loading sequence information corresponding to the object identity is determined according to the click hot zone map and the interaction area priority, and the live stream interaction area loading sequence information stored in the terminal device is updated according to the new determined loading sequence information.

In an embodiment, the colors with different shades may be used to represent different frequencies of use, so that the click hot zone map can be obtained. The darker the color, the more frequently the object uses the interaction area.

In an embodiment, priorities of interaction areas in the live stream interface are pre-designated according to the product promotion strategy, so as to ensure that the functions desired to be displayed first in the product promotion strategy can be displayed first. In another embodiment, the loading priorities of the interaction areas are determined based on the usage frequencies of the interaction areas. Optionally, the priorities of interaction areas may be recorded in the form of an interaction area ordering table.

In combination with the click hot zone map and the interaction area priority, the corresponding interaction area loading sequence information is determined, and the live stream interaction area loading sequence information stored in the terminal device is updated according to the new determined loading sequence information.

In an exemplary scheme, the step where the usage frequency information of the interaction areas in the live stream interface is determined includes the following steps: whether visualization areas in the plurality of interaction areas are clicked is judged, and in a case where the visualization areas in the plurality of interaction areas are clicked, the number of clicks on the visualization areas is counted. The visualization area includes an interaction control, text and/or animation in an interaction area, for example, one interaction area may include one or more visualization areas, and one of the visualization areas may include one or more controls.

Figure 3:
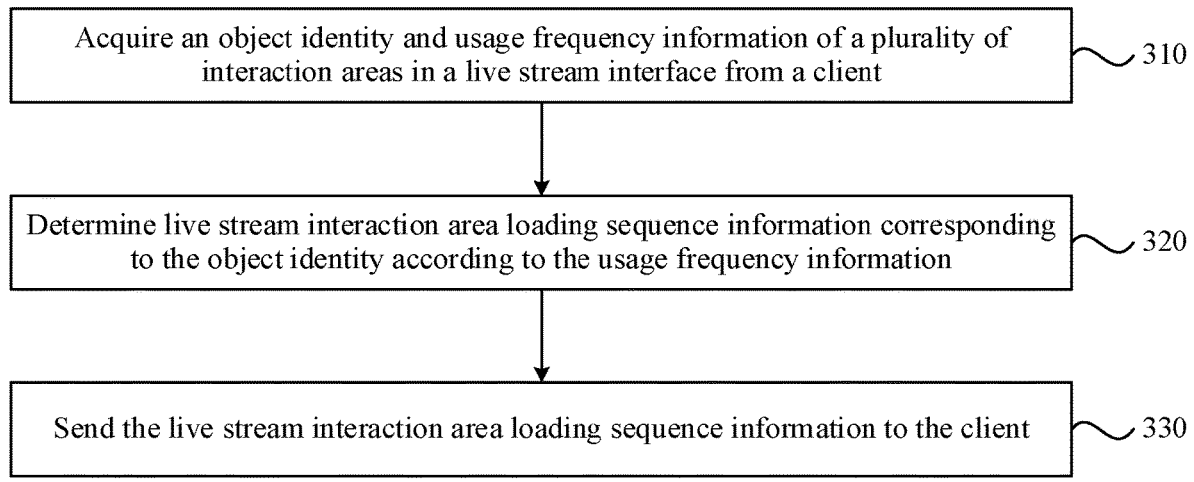
FIG. 3 is a flowchart of another live stream interface loading method provided by an embodiment of the present disclosure.

FIG. 3 is a flowchart of another live stream interface loading method provided by an embodiment of the present disclosure. The method can be executed by a live stream interface loading apparatus, and the apparatus can be composed of hardware and/or software and can be integrated into a server. As shown in FIG. 3, the method includes steps 310 and 320.

In step 310, an object identity and usage frequency information of a plurality of interaction areas in a live stream interface are acquired from a client.

In an embodiment, the usage frequency includes the clicking situation of a visualization area in an interaction area, and the clicking situation includes a click duration and the number of clicks.

For example, the server may passively receive the usage frequency of the interaction areas in the live stream interface and the object identity sent by the client.

If the interaction area includes only one visualization area, the usage frequency of the interaction area is determined according to the number of clicks and the click duration of the visualization area. If one interaction area is split into multiple visualization areas, the numbers of clicks of the visualization areas are clustered based on the correspondence between the visualization areas and the interaction areas, so as to determine the corresponding usage frequency of each interaction area.

In step 320, live stream interaction area loading sequence information corresponding to the object identity is determined according to the usage frequency information.

For example, a click hot zone map is drawn according to the usage frequency information and the object identity, and the live stream interaction area loading sequence information corresponding to the object identity is determined based on the click hot zone map.

In another example, when it is detected that a preset update event is triggered, the live stream interaction area loading sequence information corresponding to the object identity may be determined according to the usage frequency information and the interaction area priority.

There are various triggering conditions for the preset update event, which is not limited to the embodiments of the present disclosure. For example, a preset update event is triggered when the data amount of usage frequency reaches a set threshold; or, the preset update event is triggered regularly.

For example, after it is detected that the preset update event is triggered, a click hot zone map is drawn according to the usage frequency and the object identity, an interaction area priority associated with the product promotion strategy is acquired, and the interaction area loading sequence corresponding to the object identity is determined according to the click hot zone map and the interaction area priority.

The priorities of interaction areas in the live stream interface are pre-designated according to the product promotion strategy, so as to ensure that the functions desired to be displayed first in the product promotion strategy can be displayed first. Optionally, the priorities of interaction areas may be recorded in the form of an interaction area ordering table. After it is detected that the preset update event is triggered, the pre-designated interaction area ordering table may be acquired directly. In combination with the click hot zone map and the interaction area priority, the live stream interaction area loading sequence information is determined.

In step 330, the live stream interaction area loading sequence information is sent to the client.

For example, after the interaction area loading sequence of the live stream is determined, the live stream interaction area loading sequence information is sent to the client. In another example, when it is detected that an object enters a live stream, live stream interaction area loading sequence information is pushed to the client. In another example, when it is detected that an object pulls the home interface of the live stream, the interaction area loading sequence may be pushed to the client.

In the technical solution provided by this embodiment, the interaction area loading sequence corresponding to the object identity is determined according to the usage frequencies of the interaction areas and the pre-established interaction area priorities and then pushed to the client corresponding to the object identity, thereby solving the problem that only after all to-be-loaded interaction areas are loaded does the client display interaction areas in the live stream interface, satisfying the interactive needs of users, and improving interactive efficiency.

In an exemplary scheme, the step where the interaction area loading sequence corresponding to the object identity is determined according to the click hot zone map and the interaction area priority includes the following steps: a first weight corresponding to the click hot zone map is acquired; a second weight corresponding to the interaction area priority is acquired; in a case where the first weight exceeds the second weight, the live stream interaction area loading sequence information is determined according to the click hot zone map; and in a case where the second weight exceeds the first weight, the live stream interaction area loading sequence information is determined according to the interaction area priority. The first weight and the second weight may be dynamically configured according to the actual application situation. Based on the magnitude relationship between the first weight and the second weight, it is decided whether the interaction area loading sequence is determined according to the click hot zone map or whether the interaction area loading sequence is determined according to the interaction area priority. For example, according to the event planning, an interaction area is set to have the highest priority, and then displayed first by default. In another example, the first weight is set to be higher than the second weight, and then the function loading sequence is determined according to the click hot zone map. In yet another example, the second weight is set to be higher than the first weight, and then the function loading sequence is determined according to the interaction area priority.

Figure 4:
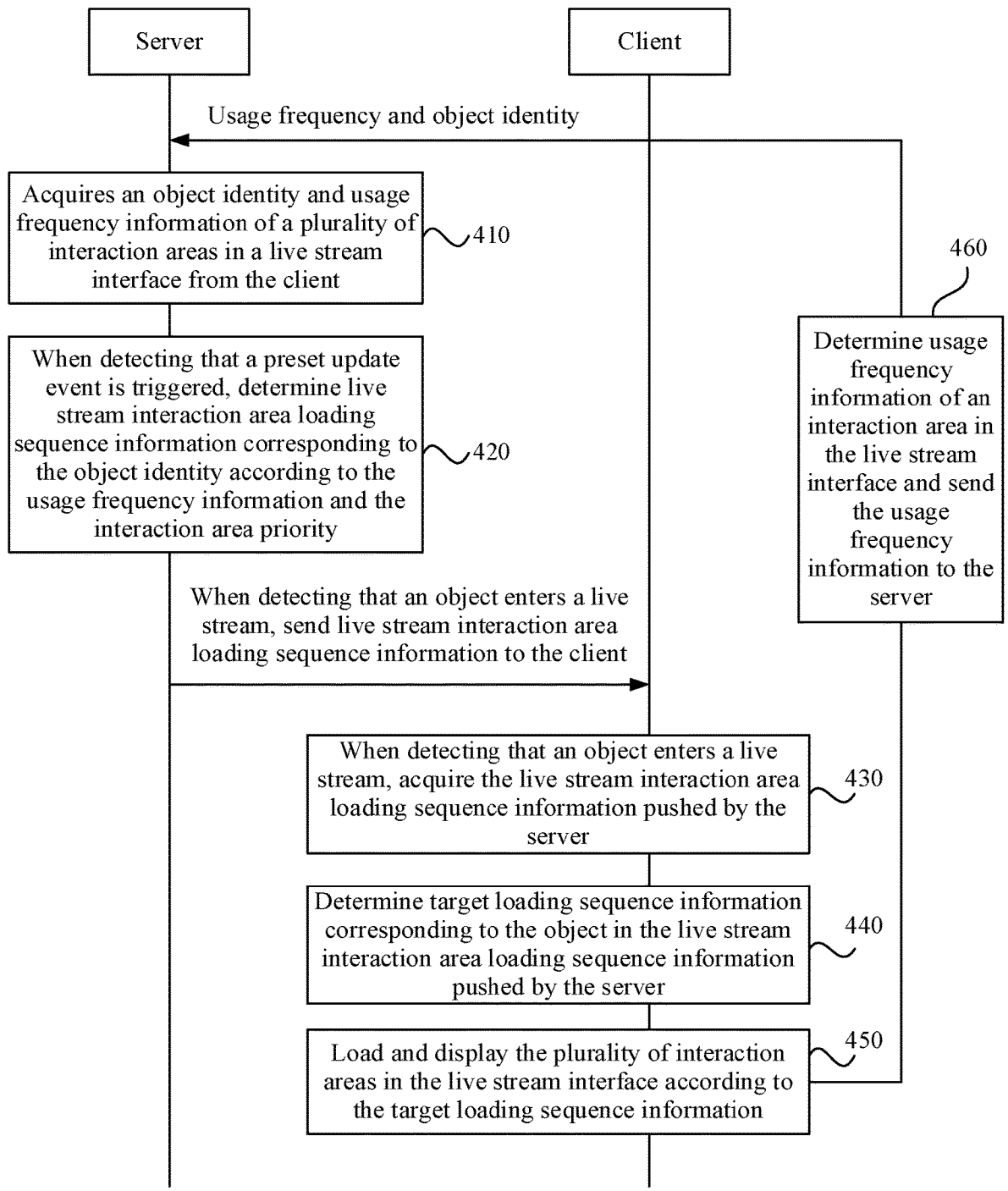
FIG. 4 is a flowchart of yet another live stream interface loading method provided by an embodiment of the present disclosure.

FIG. 4 is a flowchart of yet another live stream interface loading method provided by an embodiment of the present disclosure. As shown in FIG. 4, the method includes steps 410, 420, 430, 440, 450, and 460.

In step 410, a server acquires an object identity and usage frequency information of a plurality of interaction areas in a live stream interface from a client.

In step 420, when the server detects that a preset update event is triggered, the server determines live stream interaction area loading sequence information corresponding to the object identity according to the usage frequency information and the interaction area priority.

In step 430, when the client detects that an object enters a live stream, the client acquires the live stream interaction area loading sequence information pushed by the server.

In step 440, the client determines target loading sequence information corresponding to the object in the live stream interaction area loading sequence information pushed by the server.

In step 450, the client loads and displays the interaction areas in the live stream interface according to the target loading sequence information.

In step 460, the client determines usage frequency information of an interaction area in the live stream interface and sends the usage frequency information to the server.

Figure 5:
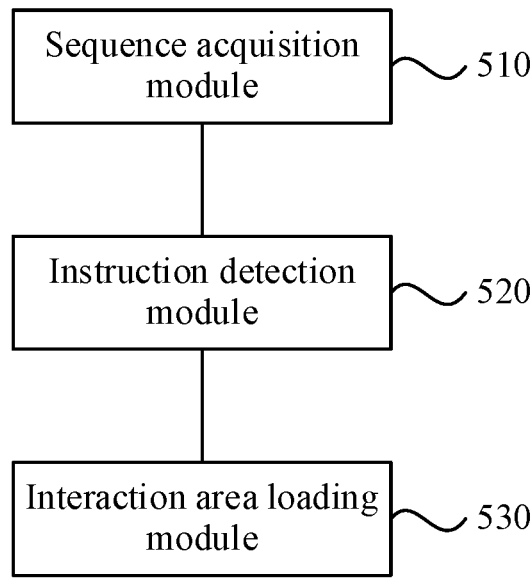
FIG. 5 is a structural schematic diagram of a live stream interface loading apparatus provided by an embodiment of the present disclosure.

FIG. 5 is a structural schematic diagram of a live stream interface loading apparatus provided by an embodiment of the present disclosure. The apparatus is integrated into a terminal. As shown in FIG. 5, the apparatus includes a sequence acquisition module 510, an instruction detection module 520, and an interaction area loading module 530.

The sequence acquisition module 510 is configured to acquire live stream interaction area loading sequence information.

The instruction detection module 520 is configured to detect a trigger instruction, where the trigger instruction is used for indicating the display of a live stream interface.

The interaction area loading module 530 is configured to load and display a plurality of interaction areas in the live stream interface according to the live stream interaction area loading sequence information.

The live stream interface loading apparatus provided by this embodiment of the present disclosure is used for implementing the live stream interface loading method, and the implementation principles and technical effects of the live stream interface loading apparatus are similar to those of the live stream interface loading method, which will not be repeated herein.

Figure 6:
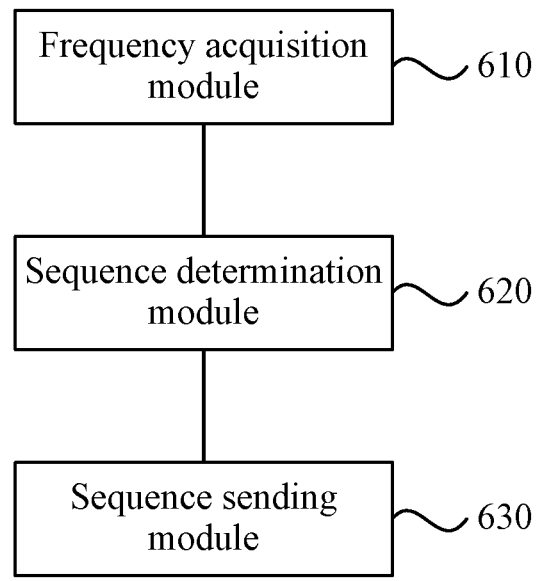
FIG. 6 is a structural schematic diagram of another live stream interface loading apparatus provided by an embodiment of the present disclosure.

FIG. 6 is a structural schematic diagram of another live stream interface loading apparatus provided by an embodiment of the present disclosure. The apparatus is integrated in a server. As shown in FIG. 6, the apparatus includes a frequency acquisition module 610, a sequence determination module 620, and a sequence sending module 630.

The frequency acquisition module 610 is configured to acquire an object identity and usage frequency information of a plurality of interaction areas in a live stream interface from a client.

The sequence determination module 620 is configured to determine live stream interaction area loading sequence information corresponding to the object identity according to the usage frequency information.

The sequence sending module 630 is configured to send the live stream interaction area loading sequence information to the client.

The live stream interface loading apparatus provided by this embodiment of the present disclosure is used for implementing the live stream interface loading method, and the implementation principles and technical effects of the live stream interface loading apparatus are similar to those of the live stream interface loading method, which will not be repeated herein.

Figure 7:
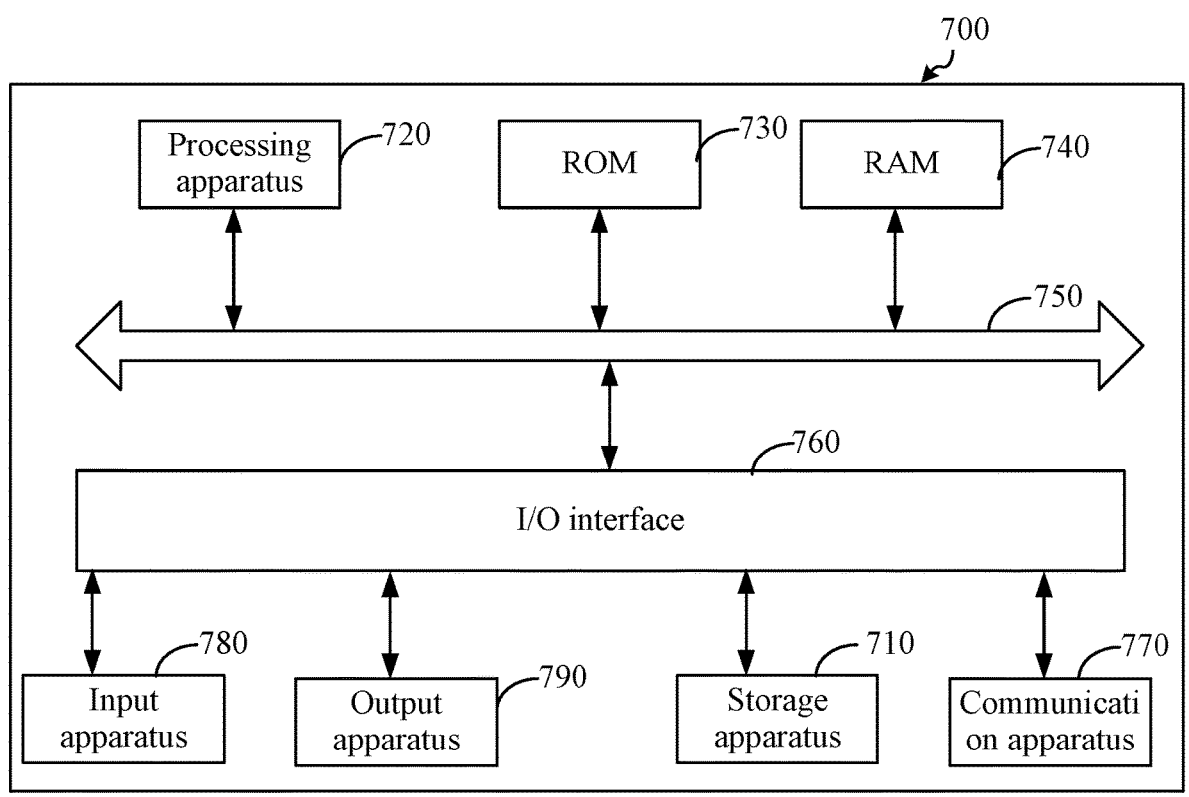
FIG. 7 is a block diagram of an electronic device provided by an embodiment of the present disclosure.

FIG. 7 is a block diagram of an electronic device provided by an embodiment of the present disclosure. With reference to FIG. 7, an electronic device 700 (a terminal or a server) suitable for implementing the embodiments of the present disclosure is illustrated below. The electronic device in this embodiment of the present disclosure may include a mobile terminal such as a mobile phone, a notebook computer, a digital stream receiver, a personal digital assistant (PDA), a portable Android device (PAD), a personal multimedia player (PMP), and a car-mounted terminal (for example, a car-mounted navigation terminal) and a stationary terminal such as a television (TV) and a desktop computer. The electronic device shown in FIG. 7 is merely an example and should not impose any limitation to the function and usage scope of the embodiments of the present disclosure.

As shown in FIG. 7, the electronic device 700 may include a processing apparatus 720 (such as a central processing unit or a graphics processor). The processing apparatus 720 may perform various appropriate operations and processing according to a program stored in a read-only memory (ROM) 730 or a program loaded into a random-access memory (RAM) 740 from a storage apparatus 710. The RAM 700 also stores various programs and data required for the operation of the electronic device 700. The processing apparatus 720, the ROM 730 and the RAM 740 are connected to each other via a bus 750. An input/output (I/O) interface 760 is also connected to the bus 750.

The following apparatus may be connected to the I/O interface 760: an input apparatus 780 such as a touch screen, a touchpad, a keyboard, a mouse, a camera, a microphone, an accelerometer and a gyroscope; an output apparatus 790 such as a liquid crystal display (LCD), a speaker and a vibrator; and a storage apparatus 710 such as a magnetic tape and a hard disk. The electronic device 700 may also include a communication apparatus 770. The communication apparatus 770 may allow the electronic device 700 to perform wireless or wired communication with other devices to exchange data. FIG. 7 shows the electronic device 700 having various apparatuses, but the electronic device 700 is not required to implement or be equipped all the shown apparatuses, and may implement more or fewer apparatuses instead.

According to this embodiment of the present disclosure, the process described above with reference to the flowchart may be implemented as a computer software program. For example, this embodiment of the present disclosure includes a computer program product. The computer program product includes a computer program carried in a computer-readable medium. The computer program includes program codes for performing the live stream interface loading method provided by the embodiments of the present disclosure. In such an embodiment, the computer program may be downloaded and installed from the network through the communication apparatus 770, or may be installed from the storage apparatus 710, or may be installed from the ROM 602. When the computer program is executed by the processing apparatus 720, the preceding functions defined in the live stream interface loading method provided by the embodiments of the present disclosure are performed.

The above-described computer-readable medium of the present disclosure may be a computer-readable signal medium, a computer-readable storage medium, or any combination thereof. The computer-readable storage medium, for example, may be an electrical, magnetic, optical, electromagnetic, infrared or semiconductor system, apparatus or device, or any combination thereof. The computer-readable storage medium may include: an electrical connection having one or more wires, a portable computer magnetic disk, a hard disk, a RAM, a ROM, an erasable programmable read-only memory (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program, and the program may be used by or used in conjunction with an instruction execution system, apparatus or device. In the present disclosure, the computer-readable signal medium may include a data signal propagated on a base band or as a part of a carrier wave, and such a data signal carries computer-readable program codes. This propagated data signal may in various forms including an electromagnetic signal, an optical signal or any suitable combination thereof. The computer-readable signal medium may further be any computer-readable medium other than a computer-readable storage medium. The computer-readable signal medium may send, propagate or transmit a program used by or used in conjunction with an instruction execution system, apparatus or device. The program codes included in the computer-readable medium may be transmitted in any suitable medium, including a wire, an optical cable, a Radio Frequency (RF) or any suitable combination thereof.

In some embodiments, the client and the server may communicate using any currently known or future developed network protocol, such as HyperText Transfer Protocol (HTTP), and may be interconnected by any form or medium of digital data communication (for example, a communication network). Examples of the communication network include a local area network (LAN), a wide area network (WAN), an internet network (for example, the Internet), and a peer-to-peer network (for example, an ad hoc peer-to-peer network).

The above-described computer-readable medium may be included in the above-described electronic device, or may exist alone without being assembled into the electronic device.

The above-described computer-readable medium carries one or more programs, and the one or more programs, when executed by the electronic device, cause the electronic device to: acquire live stream interaction area loading sequence information; detect a trigger instruction, where the trigger instruction is used for indicating the display of a live stream interface; and load and display a plurality of interaction areas in the live stream interface according to the live stream interaction area loading sequence information.

Alternatively, the above-described computer-readable medium carries one or more programs, and the one or more programs, when executed by the electronic device, cause the electronic device to: acquire an object identity and usage frequency information of a plurality of interaction areas in a live stream interface from a client; determine live stream interaction area loading sequence information corresponding to the object identity according to the usage frequency information; and send the live stream interaction area loading sequence information to the client.

Computer program codes for performing the operations of the present disclosure may be written in one or more programming languages or a combination thereof. The one or more programming languages include object-oriented programming languages such as Java, Smalltalk and C++, as well as conventional procedural programming languages such as "C" or similar programming languages. The program code may be executed entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowcharts and block diagrams in the drawings show possible architectures, functions and operations of the system, method and computer program product according to the various embodiments of the present disclosure. In this regard, each block in the flowcharts or block diagrams may represent a module, a program segment or part of codes that includes one or more executable instructions for implementing specified logical functions. In some alternative implementations, the functions noted in the blocks may occur in a different order than that shown. For example, two blocks shown in succession may in fact be executed substantially concurrently, or the blocks may sometimes be executed in the reverse order, depending upon the functionality involved. Each block of the block diagrams and/or flowcharts, and combinations of blocks in the block diagrams and/or flowcharts may be implemented by not only a specific-purpose hardware-based system that performs a specified function or operation, but also a combination of specific-purpose hardware and computer instructions.

The units involved in the embodiments of the present disclosure may be implemented by software or hardware. The names of units are not intended to limit the units themselves.

The functionality discussed herein may also be performed by, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs).

According to one or more embodiments of the present disclosure, a live stream interface loading method is provided. After the interaction areas in the live stream interface are loaded and displayed according to the live stream interaction area loading sequence information, the method further includes the step described below.

Usage frequency information of the interaction areas in the live stream interface is determined.

According to one or more embodiments of the present disclosure, a live stream interface loading method is provided. The step where the usage frequency information of the interaction areas in the live stream interface is determined includes the steps described below.

Whether visualization areas in the plurality of interaction areas are clicked is judged.

In a case where the visualization areas in the plurality of interaction areas are clicked, the number of clicks on the visualization areas is counted.

According to one or more embodiments of the present disclosure, a live stream interface loading method is provided. After the usage frequency information of the interaction areas in the live stream interface is determined, the method includes the step described below.

The usage frequency information is sent to a server, where the usage frequency information is used for updating the live stream interaction area loading sequence information.

According to one or more embodiments of the present disclosure, a live stream interface loading method is provided. After the usage frequency information of the interaction areas in the live stream interface is determined, the method includes the step described below.

The live stream interaction area loading sequence information is updated according to the usage frequency information.

According to one or more embodiments of the present disclosure, a live stream interface loading method is provided. The step where the live stream interaction area loading sequence information is acquired includes the steps described below.

An object identity is acquired.

The live stream interaction area loading sequence information is acquired from a preset storage location or a server according to the object identity.

According to one or more embodiments of the present disclosure, a live stream interface loading method is provided. The step where the interaction areas in the live stream interface are loaded and displayed according to the live stream interaction area loading sequence information includes the steps described below.

The interaction areas in the live stream interface are loaded according to the live stream interaction area loading sequence information.

Each time an interaction control in one interaction area is loaded, the interaction control is displayed.

According to one or more embodiments of the present disclosure, a live stream interface loading method is provided. The step where the live stream interaction area loading sequence information corresponding to the object identity is determined according to the usage frequency information includes the steps described below.

A click hot zone map is drawn according to the usage frequency information and the object identity.

An interaction area priority associated with a product promotion policy is acquired.

The live stream interaction area loading sequence information corresponding to the object identity is determined according to the click hot zone map and the interaction area priority.

According to one or more embodiments of the present disclosure, a live stream interface loading method is provided. The step where the live stream interaction area loading sequence information corresponding to the object identity is determined according to the click hot zone map and the interaction area priority includes the steps described below.

A first weight corresponding to the click hot zone map is acquired.

A second weight corresponding to the interaction area priority is acquired.

In a case where the first weight exceeds the second weight, the live stream interaction area loading sequence information is determined according to the click hot zone map.

In a case where the second weight exceeds the first weight, the live stream interaction area loading sequence information is determined according to the interaction area priority.

According to one or more embodiments of the present disclosure, a live stream interface loading method is provided. The step where the live stream interaction area loading sequence information is sent to the client includes the step described below.

When it is detected that an object enters a live stream, live stream interaction area loading sequence information is pushed to the client corresponding to the object.

According to one or more embodiments of the present disclosure, a live stream interface loading apparatus is provided. The apparatus further includes a frequency determination module.

The frequency determination module is configured to, after the interaction areas in the live stream interface are loaded and displayed according to the live stream interaction area loading sequence information, determine usage frequency information of the interaction areas in the live stream interface.

According to one or more embodiments of the present disclosure, a live stream interface loading apparatus is provided. The frequency determination module is configured to perform the operations described below.

Whether visualization areas in the plurality of interaction areas are clicked is judged.

In a case where the visualization areas in the plurality of interaction areas are clicked, the number of clicks on the visualization areas is counted.

According to one or more embodiments of the present disclosure, a live stream interface loading apparatus is provided. The apparatus further includes an information sending module.

The information sending module is configured to, after the usage frequency information of the interaction areas in the live stream interface is determined, send the usage frequency information to a server, where the usage frequency information is used for updating the live stream interaction area loading sequence information.

According to one or more embodiments of the present disclosure, a live stream interface loading apparatus is provided. The apparatus further includes a loading sequence update module.

The loading sequence update module is configured to, after the usage frequency information of the interaction areas in the live stream interface is determined, update the live stream interaction area loading sequence information according to the usage frequency information.

According to one or more embodiments of the present disclosure, a live stream interface loading apparatus is provided. The sequence acquisition module is configured to perform the operations described below.

An object identity is acquired.

The live stream interaction area loading sequence information is acquired from a preset storage location or a server according to the object identity.

According to one or more embodiments of the present disclosure, a live stream interface loading apparatus is provided. The interaction area loading module is configured to perform the operations described below.

The interaction areas in the live stream interface are loaded according to the live stream interaction area loading sequence information.

Each time an interaction control in one interaction area is loaded, the interaction control is displayed.

According to one or more embodiments of the present disclosure, a live stream interface loading apparatus is provided. The hot zone map drawing sub-module is configured to perform the operations described below.

The interaction area contained in live stream interface of different versions of the client is associated based on a client identity.

The usage frequency information is clustered according to the object identity and the interaction area to obtain the usage frequency information corresponding to the interaction area.

The click hot zone map of multiple objects is drawn according to the usage frequency information corresponding to the interaction area.

According to one or more embodiments of the present disclosure, a live stream interface loading apparatus is provided. The sequence determination sub-module is configured to perform the operations described below.

A first weight corresponding to the click hot zone map is acquired.

A second weight corresponding to the interaction area priority is acquired.

In a case where the first weight exceeds the second weight, the live stream interaction area loading sequence information is determined according to the click hot zone map.

In a case where the second weight exceeds the first weight, the live stream interaction area loading sequence information is determined according to the interaction area priority.

According to one or more embodiments of the present disclosure, a live stream interface loading apparatus is provided. The sequence sending module is configured to perform the operation described below.

When it is detected that an object enters a live stream, live stream interaction area loading sequence information is pushed to the client corresponding to the object.

In an embodiment, the loading sequence of live stream interaction areas is determined as the recommended loading sequence according to the usage frequencies of the live stream interaction areas. When the object enters the live stream, the recommended loading sequence is sent to the client. The usage frequency of an interaction area may be the usage frequency of a preset number of objects for the interaction area within a preset period of time.

In an embodiment, when the object sets the loading sequence of live stream interaction areas (also called as loading sequence for short), a recommended loading sequence option and a default loading sequence option are displayed for the object to select, and when the object selects the recommended loading sequence option, the interaction areas are loaded according to the recommended loading sequence.

In an embodiment, when the object sets the loading sequence, a frequency input box may be displayed for the object to input the usage frequencies of the interaction areas, or a loading sequence input box may be displayed for the object to input the loading sequence of the interaction areas.

In the above-mentioned embodiments, the object may be an object watching the live stream in a live stream, or an object enters the live stream to watch the live stream interface.

The names of messages or information exchanged between multiple apparatuses in the embodiments of the present disclosure are only for illustrative purposes and are not intended to limit the scope of such messages or information.

It is to be understood that before the technical solutions disclosed in the embodiments of the present disclosure are used, the user shall be notified of the type, use scope and use scenario of the personal information involved in the present disclosure in an appropriate manner according to relevant laws and regulations, and the authorization shall be obtained from the user.

For example, in response to an active request received from the user, prompt information is sent to the user to explicitly prompt the user that the operation requested to be performed will require the acquisition and use of personal information of the user. Therefore, the user can freely choose according to the prompt information whether to provide personal information to software or hardware that performs the operation of the technical solutions of the present disclosure, such as an electronic device, an application program, a server or a storage medium.

In an optional but non-limiting embodiment, in response to the active request received from the user, the prompt information may be sent to the user, for example, in the form of a pop-up window in which the prompt information may be presented in the form of text. In addition, the pop-up window can also carry a selection control for the user to choose "Agree" or "Disagree" to provide personal information to the electronic device.

It is to be understood that the above-mentioned notification process and the acquisition process of the user's authorization are illustrative and are not intended to limit the embodiments of the present disclosure, and other manners complying with relevant laws and regulations may also be applied to the embodiments of the present disclosure.

It is to be understood that the data (including but not limited to the data itself and the acquisition or use of the data) involved in the technical solutions shall comply with the requirements of relevant laws and regulations and relevant provisions.

Similarly, while the operations are depicted in a particular order, this should not be construed as requiring that such operations should be performed in the particular order shown or in sequential order. In certain circumstances, multitasking and parallel processing may be advantageous. Likewise, while the above description contains many implementation specifics, these should not be construed as limitations on the scope of the present disclosure. Some features that are described in the context of separate embodiments may also be implemented in combination in a single embodiment. Conversely, Various features that are described in the context of a single embodiment can also be implemented in multiple embodiments separately or in any suitable subcombination.

What is claimed is:

1. An interface loading method, comprising:
   determining first loading sequence information corresponding to a plurality of areas in an interface; and
   in response to detecting a first trigger instruction, loading and displaying the plurality of areas in the interface according to the first loading sequence information corresponding to the plurality of areas;
   wherein determining the first loading sequence information corresponding to the plurality of areas in the interface comprises: determining the first loading sequence information corresponding to the plurality of areas based on first interaction information corresponding to the plurality of areas, wherein the first interaction information corresponding to the plurality of areas indicates information about interaction operations acted on the plurality of areas.

2. The method according to claim 1, further comprising: determining the first interaction information corresponding to the plurality of areas.

3. The method according to claim 1, wherein determining the first loading sequence information corresponding to the plurality of areas in the interface further comprises:
   sending the first interaction information corresponding to the plurality of areas to a server so that the server determines the first loading sequence information corresponding to the plurality of areas based on the first interaction information; and
   receiving the first loading sequence information sent by the server.

4. The method according to claim 1, further comprising:
   determining second interaction information corresponding to the plurality of areas;
   determining second loading sequence information corresponding to the plurality of areas based on the second interaction information corresponding to the plurality of areas; or sending the second interaction information corresponding to the plurality of areas to a server so that the server determines second loading sequence information corresponding to the plurality of areas based on the second interaction information; and
   in response to detecting a second trigger instruction, loading the plurality of areas in the interface based on the second loading sequence information.

5. The method according to claim 2, wherein determining the first interaction information corresponding to the plurality of areas comprises:
   determining whether visualization areas in the plurality of areas are triggered; and in a case where the visualization areas in the plurality of areas are triggered, counting a number of trigger times for each of the visualization areas.

6. The method according to claim 1, further comprising:
acquiring an object identity; and
acquiring the first loading sequence information corresponding to the plurality of areas from a preset storage location or a server according to the object identity.

7. The method according to claim 4, wherein loading and displaying the plurality of areas in the interface according to the first loading sequence information corresponding to the plurality of areas comprises:
loading the plurality of areas in the interface according to the first loading sequence information corresponding to the plurality of areas; and
in a case where an interaction element of one of the plurality of areas is loaded, displaying the interaction element.

8. The method according to claim 1, wherein the interface is a live stream interface.

9. The method according to claim 6, wherein the plurality of areas are a plurality of interaction areas, and at least one of the first interaction information or second interaction information comprises an interaction frequency or a number of interaction operations.

10. The method according to claim 1, wherein the plurality of interaction areas comprise at least one of a follow interaction area, a gift interaction area, a leaderboard interaction area or a comment interaction area.

11. An interface loading method, comprising:
determining first loading sequence information corresponding to a plurality of areas in an interface; and
sending the first loading sequence information corresponding to the plurality of areas to a client such that the client loads and displays the plurality of areas in the interface according to the first loading sequence information corresponding to the plurality of areas,
wherein determining the first loading sequence information corresponding to the plurality of areas in the interface comprises:
receiving first interaction information corresponding to the plurality of areas in the interface sent by the client; and
determining the first loading sequence information corresponding to the plurality of areas based on the first interaction information corresponding to the plurality of areas, wherein the first interaction information corresponding to the plurality of areas indicates information about interaction operations acted on the plurality of areas.

12. The method according to claim 11, wherein determining the first loading sequence information corresponding to the plurality of areas according to the first interaction information comprises:
acquiring priorities of the plurality of areas; and
determining the first loading sequence information corresponding to the plurality of areas according to the first interaction information and the priorities of the plurality of areas.

13. The method according to claim 11, further comprising:
receiving second interaction information corresponding to the plurality of areas sent by the client;
determining second loading sequence information corresponding to the plurality of areas based on the second interaction information; and
sending the second loading sequence information corresponding to the plurality of areas to the client so that the client loads and displays the plurality of areas in the interface according to the second loading sequence information corresponding to the plurality of areas.

14. A terminal device, comprising:
one or more processors, and
a memory, configured to store one or more programs,
wherein when executed by the one or more processors, the one or more programs cause the one or more processors to implement the interface loading method according to claim 1.

15. A server, comprising:
one or more processors, and
a memory, configured to store one or more programs,
wherein when executed by the one or more processors, the one or more programs cause the one or more processors to implement the interface loading method according to claim 7.

16. A non-transitory computer-readable storage medium storing a computer program, wherein the computer program, when executed by a processor, performs the interface loading method according to claim 1.

17. A non-transitory computer-readable storage medium storing a computer program, wherein the computer program, when executed by a processor, performs the interface loading method according to claim 7.

* * * * *